H. H. WILLIAMS.
REFILLABLE LUBRICATING CUP.
APPLICATION FILED MAR. 10, 1920.

1,389,405.

Patented Aug. 30, 1921.
2 SHEETS—SHEET 1.

Inventor
Herbert H. Williams
By Emery, Varney, Blair & Hogset Attorneys

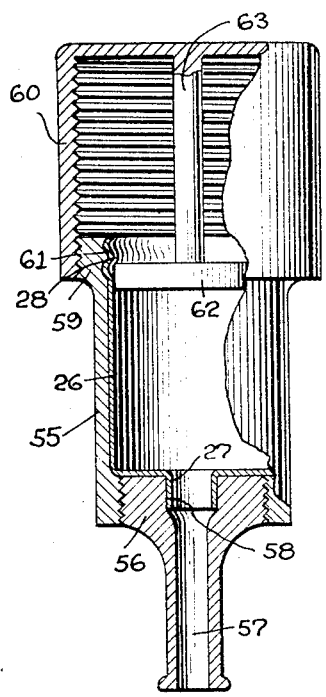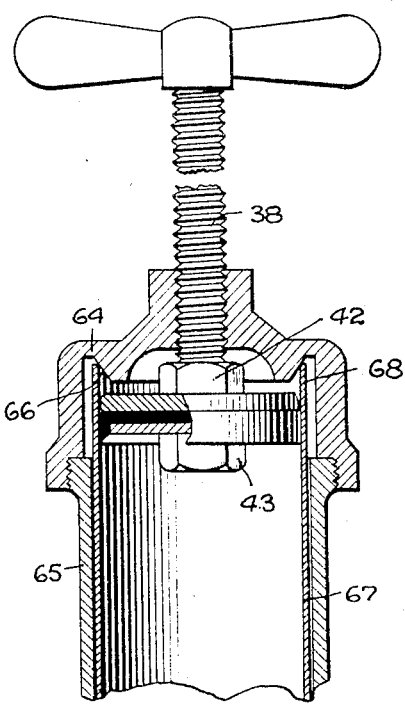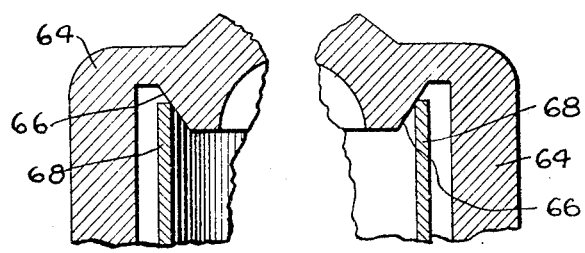

UNITED STATES PATENT OFFICE.

HERBERT H. WILLIAMS, OF BROOKLYN, NEW YORK.

REFILLABLE LUBRICATING-CUP.

1,389,405.

Specification of Letters Patent.   Patented Aug. 30, 1921.

Application filed March 10, 1920.   Serial No. 364,617.

*To all whom it may concern:*

Be it known that I, HERBERT H. WILLIAMS, a citizen of the United States, and a resident of the city of Brooklyn, county of Kings, and State of New York, have invented an Improvement in Refillable Lubricating-Cups, of which the following is a specification.

This invention relates to grease cups and grease guns such as are used for forcing grease and other lubricants into the bearings of machinery, and more particularly this invention relates to refillable lubricating devices of the above mentioned type.

An object of this invention is to provide a readily refillable grease gun or grease cup of simple construction and efficient action.

Another object of this invention is to provide a construction of the above mentioned character in which the disadvantages accompanying the manual refilling of grease cups, for example, are avoided and in which the lubricating cup or gun may be readily and quickly recharged without the necessity of manually handling the grease or other lubricant itself.

Another object is to provide a container for grease that may be conveniently inserted in a grease cup and to provide means for properly alining and retaining in alinement with the piston the inserted container.

Another object is to provide a container for insertion in a lubricating device so constructed that use of a separate piston individual to the container itself is avoided and that a single piston forming part of the grease cup or grease gun may be used to operate directly upon the contents of the container.

Other objects will be in part obvious or in part pointed out hereinafter.

The invention accordingly consists in the features of construction, combinations of elements and arrangement of parts which will be exemplified in the structure hereinafter described and the scope of the application of which will be indicated in the appended claims.

Figure 1:
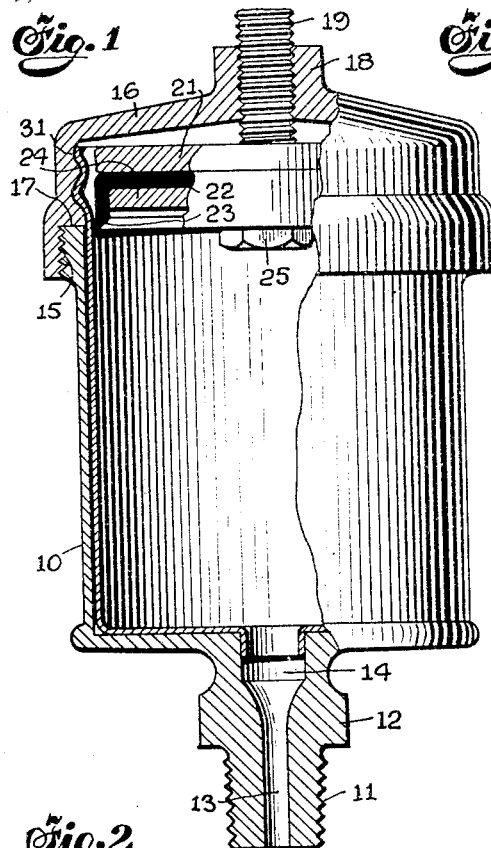
Figure 3:
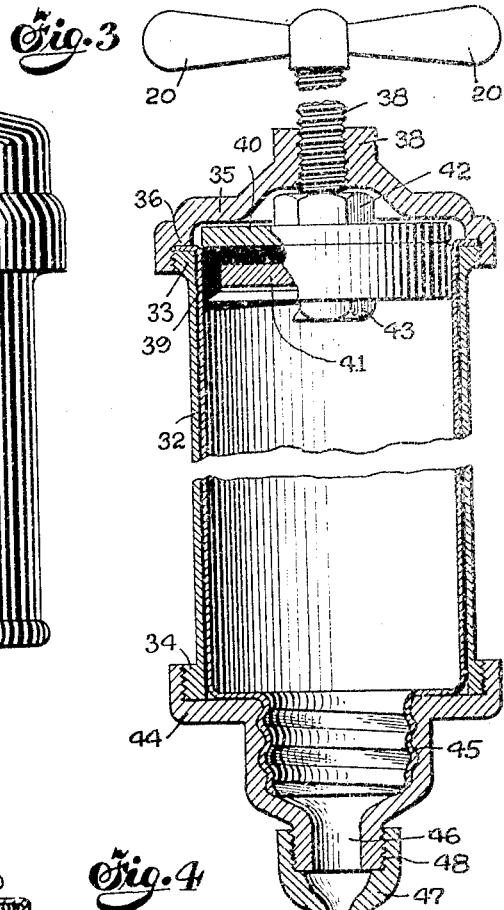
Figure 2:
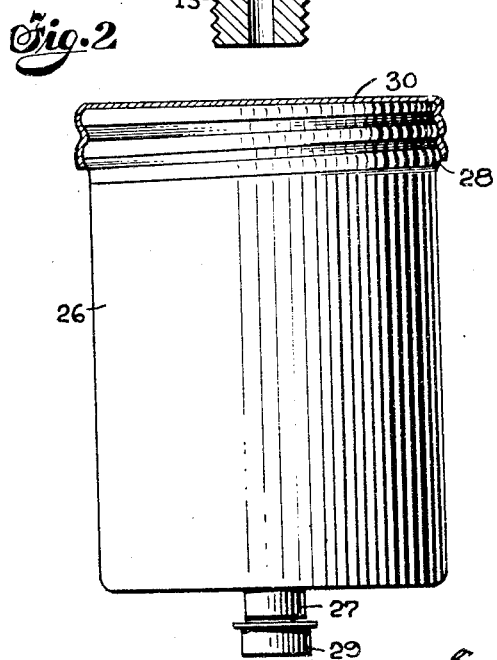
Figure 4:
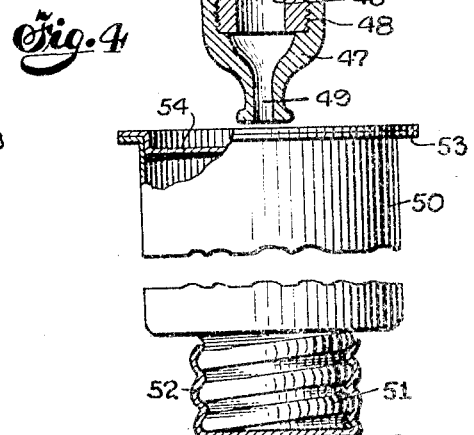

In the drawings, in which are shown several preferred embodiments of this invention by way of example and in which like reference characters refer to similar parts throughout, Figure 1 is a side elevation partly in section of a grease cup with inserted and alined container, and Fig. 2 is a side elevation of the container partly in section adapted for use with the grease cup of Fig. 1, Fig. 3 is a sectional view of a grease gun, and Fig. 4 is a side elevation, partly in section and with certain parts broken away, of a container used in connection with the grease gun in Fig. 3, and Fig. 5 is a side elevation, partly in section, of a modified form of grease gun, Fig. 6 is a sectional view, with certain parts broken away, of a grease gun or grease cup illustrating another embodiment of this invention, and Fig. 7 is an enlarged detail view of certain features of construction of the embodiment illustrated in Fig. 6.

Referring to the drawings and more particularly to Fig. 1, there is shown a grease cup 10 provided at its lower end with an extended threaded portion or nipple 11 and a square or hexagonal shank 12 for attaching and screwing the grease cup into the bushing or bearing member desired to be lubricated. Extending through the nipple 11 is a passage 13 for conducting the grease or other lubricant to the bearing, this passage 13 being provided at its upper end with a substantially cylindrical section 14 for a purpose to be hereinafter described. At the upper end of the cup 10 there is a thread 15 cut upon an enlarged reinforcing collar portion extending circumferentially of the upper end of the cup 10. The threaded portion 15 is adapted to receive a cap 16 threaded internally for engagement with the thread 15 of the cup 10 and with a circumferentially extending shoulder 17 for abutting against the face of the upper end of the cup 10. The cap 16 is provided at its central portion with a collar 18 integral therewith and internally threaded to receive the threaded piston rod 19 provided at its upper and outer extremity with a handle, such as the handle 20 of Fig. 3, for manual manipulation. At its lower end and extending within the cap 16, the threaded piston rod 19 has screwed upon it a washer 21 forming the supporting back for a washer 22, preferably of leather, and turned downwardly at its circumference as at 23 for a purpose to be hereinafter described. The diameter of the washer 21 is slightly less than the maximum outside diameter of the leather washer 22 to provide sufficient clearance as will be made clear hereinafter. The washer 22 is securely held in place by means of a washer 24 preferably also threaded upon the threaded piston rod 19 and tightly screwed up against the leather washer 22, the two threaded washers 21 and 24 being securely locked in assembled relation by means of a lock nut 25 threaded upon the lower end of the threaded rod 19.

In Fig. 2 is shown a container 26 of inexpensive sheet metal and provided at its lower end with a tubular extension 27 adapted to fit snugly within the cylindrical portion 14 of the passage 13 of the cup 10. At its upper end the container 26 is provided with threads 28 formed by rolling the sheet metal of the container 26 itself into the thread as is clearly shown in Fig. 2. The container 26 is closed at its lower tubular extension 27 by means of a cap 29 and upon being filled with grease or other lubricant is closed at its upper end by means of a cap 30 likewise provided with threads and screwed upon the threaded portion 28 of the container 26. In this manner the grease is preferably commercially put up or dispensed and the container is then placed in operative relation to the several parts of the cup 10. The cap 30 is first removed from the container and the cap 16 of the grease cup, after being removed from the grease cup 10, is screwed onto the upper end of the container 26, the threads 28 of the container engaging the interiorly threaded portion 31 of the cap 16. The cap 29 is then removed from the tubular extension 27 of the container 26 and the container inserted within the cup 10, its diameter being slightly less than the interior diameter of the cup 10, and the cap 16 is thereupon screwed onto the upper end of the grease cup 10. The threaded portions 15 and 31 are preferably threaded in the same manner, for example, right handed.

Upon the insertion of the container within the cap 16, the piston, comprising principally a leather washer 22 and its associated parts, being first withdrawn to its uppermost position within the cap 16, enters the upper part of the container 26, the diameters of the leather washer 22 being substantially equal to the interior diameter of the container 26, and the washer 21 being of slightly less diameter to provide for a substantial clearance between itself and the walls of the container 26. The parts having been assembled, in order to cause the lubricant within the container to enter the bearing or other part of the machinery desired to be lubricated, the piston rod 19 is rotated manually to cause descent of the piston within the container 26 whereupon the grease or other lubricant is forced out through the tubular extension 27 at the lower end of the container and through the passage 13 to the bearing. The piston is free properly to make this descent since the container 26 within which the piston operates is properly alined and maintained in alinement with the piston at its lower end by means of the extension 26 extending within and snugly fitting the cylindrical portion 14 and at its upper end by means of the threaded portion 28 engaging the threaded portion 31 of the cap 16.

In Figs. 3 and 4 is shown another embodiment of this invention as applied particularly to a lubricating device of the grease gun type. It will be noted that in this construction there is a cylindrical shell 32 provided with integral threaded collars 33 and 34 at its upper and lower ends respectively. Threaded to the upper collar 33 is a cap 35 with an interior circumferentially extending shoulder 36 and with a central collar portion 37 interiorly threaded to receive the threaded piston rod 38 at the upper end of which is the handle 20. At the lower end of the rod 38 a leather washer 39 is secured thereto between the supporting washer 40 and the washer 41 loosely mounted upon the threaded rod 38 and securely locked together and in position by means of lock-nuts 42 and 43.

At the lower end of the cylinder 32 there is threaded upon the collar 34 a base portion 44 interiorly threaded as at 45 and provided with an opening 46 of reduced section at the lower end thereof. A nozzle 47 is screwed to the base portion 44 by means of the threads 48 to form an extended passage 49 of suitable length for discharging the grease or lubricant.

The shell 32 is adapted to receive a container 50, more clearly shown in Fig. 4, having at its lower end a threaded extension 51 onto which is screwed a cap 52 for closing the lower end of the container and provided at its upper end with a flange 53 extending outwardly and circumferentially of the container. The container when filled with grease or lubricant is closed at its upper end by means of a cap 54 fitted thereto. The container 50, after the removal of the caps 52 and 54, is inserted into the shell 32, the cap 35 having been previously removed or unscrewed from the threaded collar portion 33 and the piston having been withdrawn to its uppermost position well within the cap 35. The container 50 is thereupon rotated so that the threaded extension 51 thereof is securely screwed into the threaded portion 45 of the base member 44 until the flange 53 is brought to bear upon the upper end face of the shell 32. The cap 35 with its associated piston is thereupon put into position and screwed onto the collar portion 33, the piston entering the container 50 and the shoulder 36 of the cap 35 securely clamping the flange 53 between itself and the upper end face of the shell 32. The container 50 is thus positively and properly alined with the piston and securely held in position within the grease gun, whereupon a discharge of grease or lubricant through the passage 49 is caused to take place by manually rotating and advancing the piston within the container by means of the handle 20 and the threaded piston rod 38.

In Fig. 5 is illustrated a grease gun comprising a main shell 55 into the lower end of which is threaded a nozzle 56 provided with a passage 57 the upper end of which is provided with a substantially cylindrical section 58 for a purpose to be hereinafter described.

The upper end of the shell 55 is reinforced to provide a collar 59 threaded on its exterior surface to receive the interiorly threaded cap and handle 60 which has a greater interior diameter than the exterior diameter of the shell 55. At the interior of the upper end of shell 55 there is a female thread 61 adapted to receive the upper threaded portion 28 of the container 26, of similar construction as that shown in Fig. 2, and the lower reduced extension 27 of which is received by and fits snugly within the cylindrical section 58 in the upper end of the nozzle 56. The container 26 is inserted into the shell 55 and securely screwed therein, whereby the upper threaded portion 28 and the lower extension 27 coöperating with the female thread 61 and the cylindrical section 58 of the nozzle 56 respectively properly aline the container 26 with the piston indicated as at 62 rigidly mounted upon the lower end of a piston rod 63 rigidly and centrally secured to the interior of the upper end of the cap 60. The lubricant is forced through the passage 57 of the nozzle 56 by rotating the combined handle and cap 60, whereby the cap and its associated piston 62 is advanced downwardly.

Fig. 6 shows a modified form of this invention wherein the cap 64 threaded onto the shell 65 is provided with an interiorly and circumferentially extending shoulder or bead 66, this shoulder extending downwardly from the upper interior part of the cap to provide a conical centering or abutting surface as will be more clearly described hereinafter. The cap 64 is furthermore provided with a piston rod 38 and associated piston parts of substantially similar construction as shown in Fig. 3 and numbered in Fig. 6 to correspond with Fig. 3. The shell 65 is adapted to receive a container 67, the lower alining members of which may be constructed as shown in Fig. 2 or as shown in Fig. 4, the shell 65 having a corresponding construction at its lower end. As illustrated in Fig. 6 and in greater detail in the enlarged view of Fig. 7, certain parts being broken away for purposes of greater clearness, the container 67 is substantially cylindrical throughout its upper end and at its extreme upper end is adapted to be engaged by the conical centering or abutting shoulder 66 of the cap 64 for properly alining the upper end of the container with the piston. As the cap 64 is screwed onto the casing or shell 65, the shoulder or bead 66 with its exterior conical surface, enters the upper end of the container and properly alines and maintains in proper alinement the upper end of the container with the piston, the lower end of the container being held in proper alinement by either of the means shown in Figs. 2 or 4.

It will be noted that there has been provided in this invention a readily refillable grease gun or grease cup, the container of which is maintained in proper alinement with the piston of the grease cup or gun and which container it is not necessary to provide with a separate piston individual to the container, the single piston of the grease cup or grease gun operating directly upon the contents of the properly alined container. It will be further noted that the several objects as well as others have been attained and that many advantages have been achieved.

It will be particularly noted that in the several modifications illustrated a perfect alinement of the container with the piston is obtained by providing the container with two alining elements, one of which is screw threaded, thus preventing longitudinal movement of the container with respect to the main casing, and the other of which operates to hold the container in place by the abutment of a portion of the container upon a portion of the main casing, which latter alining element may serve to prevent relative lateral movement between the container and the main casing. The container is thus positively secured within the casing and at all times held in proper alinement with the piston.

It will also be clear that the exterior walls of the container may, if desired, closely contact with the interior surface or walls of the casing, the outside diameter of the container being made sufficiently less than the inside diameter of the casing in order to permit a substantially snug fit of the container within the casing, so that the fitting of the container within the casing may assist to a substantial degree in maintaining the container in proper alinement with the piston. While it may be feasible to depend entirely upon such manner of alinement, I prefer not to dispense entirely with the end alining members hereinbefore described and prefer to have the casing assist the end alining members in holding the container in proper position with respect to the piston.

As various possible embodiments may be made in the above invention and as various changes might be made in the embodiment above set forth, it is to be understood that all matter herein set forth or shown in the accompanying drawings is to be interpreted as illustrative and not in a limiting sense.

I claim:

1. In a device of the class described, in combination, a main casing provided at its upper end with a removable cap, a piston mounted in said cap, a container for insertion into said casing, threaded means for alining one end of said container with said piston within said casing, a circular extension at the other end of said container contacting with a coöperating surface of the casing for alining the other end of said container with said piston, and means for advancing said piston into said alined container.

2. In a device of the class described, in combination, a main casing, a removable cap mounted at the upper end of said casing, a piston mounted in said cap and having a lesser diameter than the inside diameter of said casing, a container for insertion into said casing independently of said piston and having an outside diameter less than the inside diameter of said casing and an inside diameter substantially equal to the diameter of said piston, said container being open at its upper end to permit entry of said piston therein, means for alining said container with said piston, and means for advancing said piston into the container.

3. In a device of the class described, in combination, a main casing, a removable cap mounted at the upper end of said casing and provided with an internal thread, a container for insertion into said casing provided with a threaded portion at its upper end for engagement with said internal thread of said cap, a piston mounted in said cap having a diameter substantially equal to the inside diameter of said container, means for alining the lower end of said container with said piston, and means for advancing said piston into said container.

4. In a device of the class described, in combination, a main casing having at its lower end a cylindrical recess terminating in a tubular passage, a container for insertion into said casing, a removable cap mounted at the upper end of said casing, a piston mounted in said cap, means for securing the upper end of said container within said cap and for alining said upper end with said piston, a tubular extension at the lower end of said container adapted to be received by said cylindrical recess in said casing for alining the lower end of said container with said piston, and means for advancing said piston into said container.

5. In a device of the class described, in combination, a main casing having at its lower end a substantially cylindrical opening, a removable cap mounted at the upper end of said casing, said cap being provided with an internally threaded portion, a container for insertion into said casing having at its upper end a threaded portion for engagement with said threaded portion of said cap and having at its lower end a tubular extension for engagement with said cylindrical opening in said casing, a piston mounted upon said removable cap and having a diameter substantially equal to the inside diameter of said container, and means for advancing said piston into said container.

6. In a device of the class described, in combination, a main casing having at its lower end a cylindrical opening, a removable cap adapted to be mounted upon the upper end of said casing, a piston mounted on said cap, a container for insertion into said casing having an inside diameter substantially equal to the diameter of said piston, a tubular extension at the lower end of said container to be received by said cylindrical opening in said casing for alining the lower end of said container with said piston, means for securing the upper end of said casing within said removable cap, means for securing said cap to said casing whereby the upper end of said container is alined with said piston, and means for advancing said piston into said container.

7. In a device of the class described, in combination, a sheet metal container of substantially cylindrical form having a threaded portion at one end thereof, a threaded cap adapted to be screwed onto said threaded portion to close said one end of said container, a tubular extension of lesser diameter than said container at the other end thereof, and a cap for closing said tubular extension.

8. In a device of the class described, in combination, a main casing provided at its lower end with a tubular exit passage, a removable cap mounted at the upper end of said casing, a piston mounted in said cap and having a lesser diameter than the inside diameter of said casing, a container for insertion into said casing adapted to fit snugly therein and having an inside diameter substantially equal to the diameter of said piston, an opening in the bottom of said container adapted to register with said tubular exit passage in said casing, and means for advancing said piston into said container.

In testimony whereof I have signed my name to this specification this 8th day of March, 1920.

HERBERT H. WILLIAMS.